United States Patent [19]

Herzog et al.

[11] 4,128,792
[45] Dec. 5, 1978

[54] CONTROL AND PROTECTION OF BRUSHLESS SYNCHRONOUS MOTORS

[75] Inventors: Gordon W. Herzog; Herbert A. Gaensbauer, both of Peterborough, Canada

[73] Assignee: Canadian General Electric Company Limited, Toronto, Canada

[21] Appl. No.: 785,503

[22] Filed: Apr. 7, 1977

[30] Foreign Application Priority Data

Apr. 29, 1976 [CA] Canada .................................. 251478

[51] Int. Cl.² .............................................. H02P 1/46
[52] U.S. Cl. ..................................... 318/706; 318/465; 318/714
[58] Field of Search ................ 318/176, 174, 193, 190, 318/476, 478, 445, 465

[56] References Cited

U.S. PATENT DOCUMENTS

| 3,405,338 | 10/1968 | Frola | 318/193 |
| 3,582,735 | 6/1971 | Maruschak | 318/193 |

*Primary Examiner*—Herman J. Hohauser
*Attorney, Agent, or Firm*—R. A. Eckersley

[57] ABSTRACT

Apparatus for controlling the starting of a three-phase, salient pole, synchronous motor employs a signal representing slip frequency obtained from a power sensor connected to the motor supply. It requires no connection to the field coil or to other motor component. Since the signal can be obtained from a power sensor, the starting can be controlled from a location remote from the motor, for example at the motor control switchgear. A detector determines when the signal has decreased in frequency to a point representing a rotor speed where field excitation should be applied and it provides an output control signal. This control signal causes field excitation to be applied. In its broadest sense the apparatus may be used to indicate slip frequency remotely.

11 Claims, 4 Drawing Figures

CONTROL AND PROTECTION OF BRUSHLESS SYNCHRONOUS MOTORS

BACKGROUND OF THE INVENTION

This invention relates to the control and protection of a synchronous motor, and in particular it relates to the remote determination of slip frequency which is useful for the control and protection of a brushless salient pole synchronous motor during starting of the motor.

The starting of a three phase synchronous motor is a relatively critical operation. During the starting of a synchronous motor, field excitation is applied when the rotor is rotating at a speed near the synchronous speed to effect synchronism with the power source. The field excitation must be applied after the rotor has reached a certain minimum speed for the rotor and connected load to be pulled into synchronism. If the field excitation is applied too early, excessive current torque and vibration will occur. Also, field excitation must be applied before the rotor reaches a speed from which it will pull into step without excitation, and this is of particular importance for motors with comparatively light loads. If a motor should pull into step without field excitation, the motor may have synchronized on the wrong polarity, and if excitation is then applied large stator currents will occur with undesirable results. In addition, if a motor operates for an excessive time before excitation is applied, overheating will occur which could cause damage to the motor windings.

Every motor is designed with a particular "pull in" speed, that is with a particular rotor speed where application of field excitation will effect synchronism with the power source. This pull in speed is normally in the range of about 94 to 99% of synchronous speed. Thus each combination of motor and load has a particular pull in speed below which field excitation should not be applied, and it may have a slightly higher speed where it will pull into synchronism without excitation. The two speeds may be quite close together and a rapidly accelerating motor could reach pull in speed in perhaps 5 to 8 seconds and pass to the higher speed very quickly. It will be seen that the starting operation is quite critical and the field excitation is normally applied automatically (i.e., by machine) as it is difficult for an operator to respond in the very short time available and to initiate application of field excitation.

The criticality of starting a three phase synchronous motor has been recognized in the prior art, and it is common to have a tachometer mounted on or mechanically connected to the motor to effect synchronism either automatically or by an operator when the motor reaches a predetermined pull in speed. A mechanical arrangement for obtaining an indication of speed is subject to wear and may not be desirable. Also it is not always convenient to have a display of motor speed at the operator position. It is, of course, possible to obtain from the tachometer a signal representing motor speed and to conduct this signal to a remote location. This however requires wires or other signal carrying means.

In another prior art arrangement for starting synchronous motors, the induced current is measured in the field winding of the motor. This induced current fluctuates at slip frequency and the measurement can therefore be used to determine rotor speed. The determination of rotor speed thus requires the use of slip rings, which makes it an undesirable arrangement for use in hazardous atmospheres. The signal is obtained at the operating position, i.e., at the motor, and if it is to be used remotely, for example, at a remote switching location, then wires or other signal carrying means must run to the remote location. It should be noted that the signal is not available in brushless synchronous motors where the field windings are not available externally of the motor.

It is therefore an object of the invention to provide means for convenient remote detection of the slip frequency of a two, three or six-phase salient pole synchronous motor.

It is also an object of the invention to provide improved apparatus for controlling the starting of a three phase salient pole synchronous motor.

It is another object of the invention to provide apparatus for controlling the starting of a three phase salient pole synchronous motor, which apparatus may be located remotely from the motor, for example at the switchgear for use with the motor installation, and which requires no additional wires running from the motor.

SUMMARY OF THE INVENTION

Very briefly, the present invention monitors power during starting of a salient pole synchronous motor to derive a signal related to slip frequency. It is significant that the flip frequency is determined by monitoring power supplied to the synchronous motor. This means that no connections for measurement need be made to the field windings or to other motor components. The measurement connections are to the power supply and consequently they can be made at a point remote from the motor. When the signal related to slip frequency is to be used for starting, the signal is then filtered and shaped. The apparatus then determines when the slip frequency decreases to a predetermined level representing a predetermined rotor speed, and then it provides an output signal to initiate application of the motor field.

The apparatus of the invention can conveniently include timing means which will either signal or actuate a tripping means if the rotor does not reach a predetermined speed within a predetermined time of initiating the starting operation. Also, the apparatus can, if desired, apply field excitation in steps at preselected speeds. In addition the apparatus can conveniently include means to provide a signal if the motor should pull out of synchronization after it has started.

Therefore, according to the invention in one form there is provided an apparatus for sensing the slip frequency of a two, three and six phase salient pole synchronous motor connected to a source of electrical power having a predetermined line frequency. The apparatus includes a plurality of power sensing means. There are a sufficient number of power sensing means each sensing power in a respective phase, that when their outputs are summed appropriately, they will give a uniform total power indication at motor synchronous speed. Each power sensing means provides a signal representative of sensed power in a respective phase, and these signals are summed to derive an output signal representing supplied power. The output signal fluctuates at a frequency related to slip frequency.

According to another form of the invention there is provided apparatus for use in the starting of a two, three and six phase salient pole synchronous motor. The motor has means to accelerate the rotor towards synchronous speed, and it also has means to apply field excitation. The means to apply field excitation is intended to be energized at a predetermined rotor speed. The apparatus has means for deriving a signal related a slip frequency and this means is connected only to the source of power supplying the motor. A detection means receives the signal, determines when the slip frequency decreases to a value representing said predetermined rotor speed, and provides an output signal representing the determination. A field excitation control means is responsive to the output signal to energize the field excitation means.

DESCRIPTION OF A PREFERRED EMBODIMENT

Apparatus suitable for starting a three phase salient pole synchronous motor will be described with reference to FIGS. 1 and 2. it will be apparent that the invention may also be used for starting a six phase motor in the same manner, and it may also be used with a two phase motor.

Figure 1:
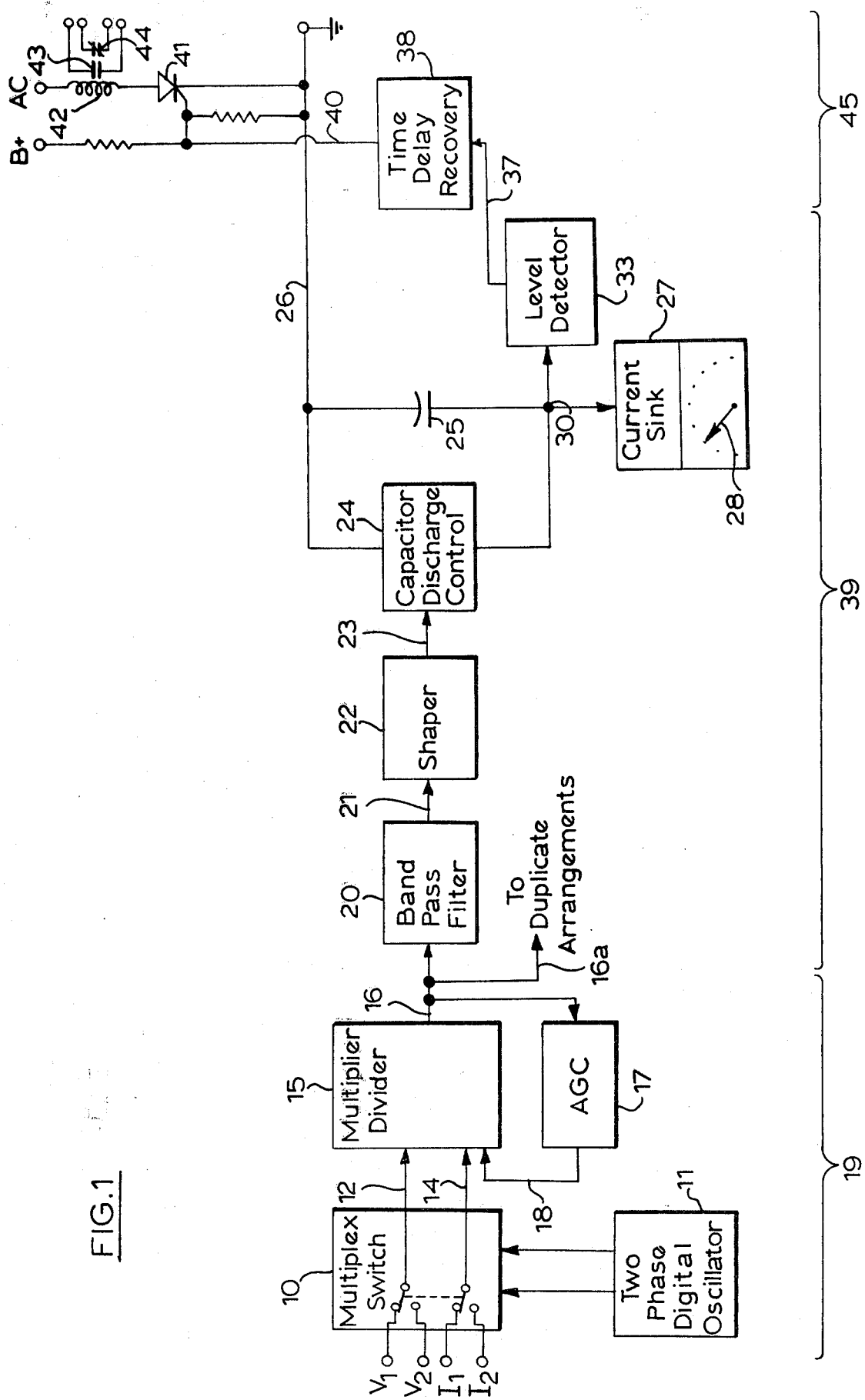
FIG. 1 is a simplified block schematic diagram of apparatus according to one form of the invention.

In FIG. 1 a multiplex switch 10 has four switches operated by a two phase digital oscillator 11 which operates at a frequency many times greater than the frequency of the power system. For example, the oscillator 11 may operate at 10 K Hz. The oscillator 11 provides two rectangular wave switching outputs at its operating frequency. One output is positive while the other is negative to cause the multiplex switch 10 to switch back and forth between two conditions. A schematic representation of the switching arrangement is shown within the box representing multiplex switch 10. There are four inputs to multiplex switch 10 and these are indicated as $V_1$, $V_2$, and $I_2$. The voltages $V_1$ and $V_2$ may represent, for example, the voltages between phases 1 and 3 and between phases 2 and 3 respectively in a three phase system. The currents $I_1$ and $I_2$ may represent currents in phases 1 and 3. The multiplex switch 10 switches back and forth between $V_1$ and $V_2$ to provide a voltage output on conductor 12 representing repeated samples of the two voltage levels. Similarly the multiplex switch provides on conductor 14 a signal representing repeated samples of currents $I_1$ and $I_2$. The signals on conductors 12 and 14 are in synchronism with one another so that, for example, the signal representing $V_1$ is on conductor 12 when the signal representing $I_1$ is on conductor 14. These signals on conductors 12 and 14 are applied to a multiplier/divider 15 which multiplies $V_1 \times I_1$ to give an indication of power, then multiplies $V_2 \times I_2$ to give an indication of power. These two signals are summed and the summed output appears on conductors 16. The signal on conductor 16 is applied to an automatic gain control circuit 17 whose output is fed back to multiplier/divider 15 over conductor 18. The automatic gain control signal (AGC signal) on conductor 18 is used, in effect, to divide the signal representing the summed products of $V \times I$ to provide a controlled output on conductor 16 as is well known in the art.

The portion of the apparatus so far described represents a means for deriving a signal related to slip frequency and the signal is proportional to twice slip frequency. This portion of the apparatus is indicated by bracket 19.

The power indication or power signal on conductor 16 would be a uniform or constant signal for a three phase salient pole synchronous motor operating at synchronous speeds. However when the field is rotating at a speed greater than the rotor, for example when the motor is being started and the rotor is not at synchronous rotor speed, then the power signal will include a pulsation or fluctuation at twice slip frequency.

The signal on conductor 16 represents power in the three phase system. It would, of course, be possible to separately obtain the product of $V_1 \times I_1$ and of $V_2 \times I_2$ using two multipliers and then to add these two separate products together to get a representation of power. This is known in the prior art. However, in this prior art system the two multipliers must be balanced if an accurate representation of power is to be maintained. In the arrangement just described in connection with FIG. 1, only one multiplier is used and there is no need to balance or calibrate a pair of multipliers. The input to multiplier 15 switches back and forth between $V_1 \times I_1$ and $V_2 \times I_2$ at the frequency of oscillator 11 (perhaps at 10 K Hz) and the output is the sum of these two products. This is believed to be a novel arrangement for obaining a power indication for a three phase system.

The signal on conductor 16 is applied to a band pass filter 20 which has a band pass of the order of 1 to 20 Hz. It is desirble to eliminate transient effects and to eliminate the frequency of the power source which is normally 60 Hz and filter 20 is included for this purpose. The output from filter 20 is on conductor 21 and is applied to a shaper 22.

If duplicate arrangements are desired and signal on conductor 16 is made available at 16a. This will be referred to subsequently.

The waveform on conductor 21 represents the form of the power input during starting. The signal on conductor 21 will pulsate at twice the slip frequency, that is, it will include a component which pulsates at twice slip frequency. Thus, when the rotor speeds up and approaches the speed of the rotating field the slip frequency will decrease, and the waveform (a) in FIG. 2 represents the signal on conductor 21 as the rotor accelerates towards the speed of the rotating field, that is towards synchronous speed.

Figure 2:
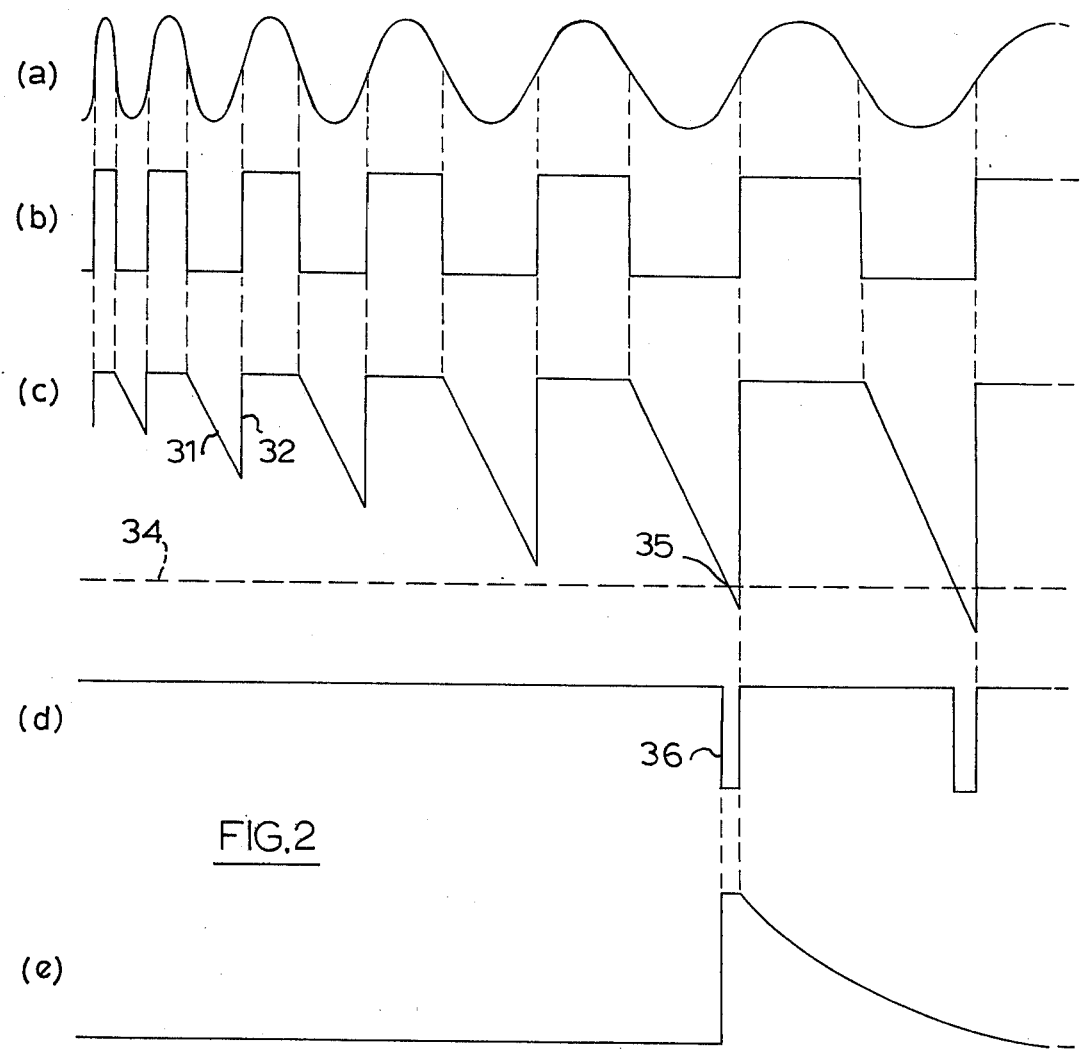
FIG. 2 is a waveform diagram useful in describing the operation of FIG. 1.

The wave shaper 22 receives the signal on conductor 21 and changes or shapes it into a rectangular waveform of the same frequency such as is shown by (b) in FIG. 2. The output from shaper 22, on conductor 23, is thus in the form shown in FIG. 2(b) and this is applied to a capacitor discharge control 24. Capacitor discharge control 24 operates as a switch under the control of the signal on conductor 23. Capacitor discharge control 24 is connected across a capacitor 25 and both are connected between a common conductor 26 which may, for example be ground, and a current sink 27. Current sink 27 is adjustable as indicated by an adjusting lever 28 so that the rate of charge of capacitor 25 may be set to a desired rate representing a desired slip frequency for triggering as will be described in more detail hereinafter. The current charging the capacitor is preferably constant to provide a linear response.

The waveform at point 30, caused by the charging of capacitor 25 when capacitor discharge control 24 presents an open circuit, and the discharging of capacitor 25 when control 24 presents a closed circuit shorting capacitor 25, is shown by waveform (c) in FIG. 2. As waveform (c) of FIG. 2 shows, capacitor 25 charges (negatively) as seen for example at 31, and is discharged, for example at 32, when waveform (b) goes in a positive direction. As the frequency of the waveform (b) decreases, the capacitor 25 charges for a longer interval and its point of maximum charge increases (negatively, as shown). A level detector 33 is connected to point 30 and it is set to detect a signal level in excess of a predetermined level. In FIG. 2(c) the predetermined level is indicated by a broken line 34. When the charge on capacitor 25 exceeds level 34 (negatively, as shown), for example at point 35 in waveform (c) of FIG. 2, the level detector will provide an output pulse on conductor 37. The output pulse on conductor 37 is represented by pulse 36 in waveform (d) of FIG. 2.

The portion of the apparatus indicated by bracket 39 may be referred to as a detection means for determining when slip frequency has decreased to a predetermined frequency representing a desired rotor speed.

The output pulse 36 on conductor 37 is applied to a time delay recovery circuit 38 which, when it receives a pulse from conductor 37, provides a triggering signal on conductor 40. Time delay recovery circuit 38 when actuated gives a longer signal as an output, that is the pulse is lengthened in some manner to give a triggering signal on conductor 40 with sufficient duration for satisfactory operation. The time delay recovery circuit 38 will not provide another output until it recovers. For example, time delay recovery circuit 38 might provide on conductor 40 a signal represented by waveform (e) of FIG. 2. The delay interval or recovery interval may be considerably longer than that interval indicated in waveform (e) of FIG. 2. The recovery period ensures that subsequent pulses do not affect the operation. As indicated by (e) in FIG. 2, the time delay recovery circuit provides a positive going pulse on conductor 40 as this is required by the following circuitry.

Conductor 40 is connected to the gate of a silicon controlled rectifier (SCR) 41 which is connected in series with a coil 42 between a source of alternating current and ground. When a positive going triggering signal or gate signal is on conductor 40, SCR 41 conducts and the current flowing through coil 42 operates switch 43 which is connected to circuitry (not shown) for applying the field excitation to a synchronous motor. Switch 43 would normally include latching means or locking means to hold it closed after current in coil 42 stops.

An addition switch 44 may be provided, if desired, for other purposes such as, for example, to disconnect the starting apparatus.

The portion of the apparatus indicated by bracket 45 may be referred to as a field excitation control means.

It is believed the operation of the apparatus described will be clear. Very briefly, multiplex switch 10 is connected to the conductors supplying power to a synchronous motor to obtain signals $V_1$, $V_2$, $I_1$ and $I_2$ as described. The synchronous motor is preferably a brushless exciter with a field winding provided with power from an external source. It is this power to the field winding that must be applied at the appropriate time. A signal representing power is obtained and this signal pulsates at twice the slip frequency. As the starting proceeds, the riotor accelerates and the slip frequency decreases. The frequency of pulsation of the signal also decreases. The signal is shaped into a rectangular form and this shaped signal is used to control the charging of a capacitor. As the frequency decreases there is a longer interval between the start of charging and the discharging of the capacitor. As the charging rate of the capacitor is substantially constant, the charge on the capacitor prior to its discharge increases as the slip frequency decreases. When this charge reaches a predetermined level (representing a desired slip frequency or a desired rotor speed) a switch is operated to apply field excitation. The charging rate can be varied so that the frequency at which the excitation field is applied can be selected according to motor design. Thus, the excitation field can be automatically applied at the appropriate rotor speed.

As was previously mentioned the apparatus of the invention could be used for starting of synchronous motors intended to run on six phases as well as three phases, as the power when synchronized is constant and it is relatively easy when starting to detect a pulsation in power which is proportional to twice slip frequency. Although twelve phase motors are unlikely to be encountered, the apparatus of the invention could be applied to a two phase motor as will be apparent to those skilled in the art. If a signal related to slip frequency can be determined from a power detecting means in synchronous motors and distinguished clearly, then the invention may be used.

It is previously mentioned that the apparatus of the invention can include timing means which will determine whether or not the rotor has reached a desired speed within a predetermined time of initiating the starting operation, and if it has not done so the apparatus can provide a warning signal or actuate a tripping device to disconnect the motor from the power source. For example, the apparatus may be arranged to determine whether the motor has reached say 25% of synchronous speed in a predetermined numbers of seconds, or the apparatus may be arranged to determine if the rotor has reached pull in speed in a predetermined number of seconds, or both.

Figure 3:
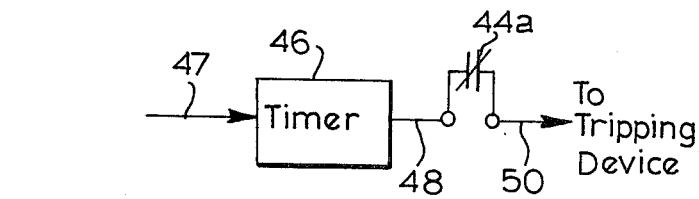
FIG. 3 is a simplified block schematic diagram showing an additional feature of the invention.

Referring now to FIG. 3, there is shown a timer 46 that is actuated by a signal over conductor 47. The signal on conductor 47 comes from control apparatus (not shown) which initiates the starting of the motor and the signal on conductor 47 represents the moment at which the starting of the motor is initiated. This signal actuates timer 47 which then times a preset time from the moment at which the starting of the motor is initiated and then it provides a signal on conductor 48. It will be recalled that normally closed switch 44 (FIG. 2) was opened when coil 42 was energized to apply field excitation. FIG. 3 shows a similar switch 44a which is normally closed and switched to its open position when coil 42 (FIG. 2) is energized. If switch 44a is still in its normally closed position, because the rotor has not reached the speed where field excitation is to be applied, then the signal on conductor 48 is passed by switch 44a to conductor 50 which is connected to a tripping device (not shown). The signal on conductor 50 actuates the tripping device to disconnect the motor from the power source. On the other hand, if the rotor has reached the pull in speed, switch 44a will be in its open position and the signal from timer 46 will not reach the tripping device. It will be seen that the very simple arrangement of FIG. 3 will disconnect the motor if the rotor has not reached the pull in speed within a predetermined period of time after starting has been initiated.

Figure 4:
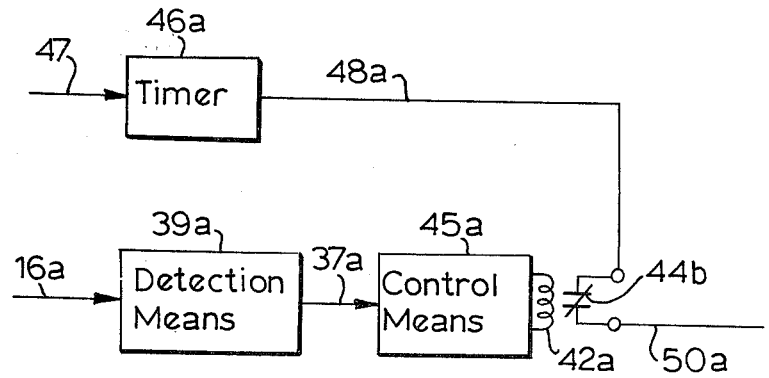
FIG. 4 is a simplified block schematic diagram showing another additional feature of the invention.

FIG. 4 shows a simple arrangement which will operate a tripping device to disconnect the motor if the rotor has not reached a predetermined speed, less than its pull in speed, in a predetermined period of time after starting has been initiated.

FIG. 4 shows a simple arrangement which will operate a tripping device to disconnect the motor if the rotor has not reached a predetermined speed, less than its pull in speed, in a predetermined period of time after starting has been initiated. A timer 46a has a conductor 47 connected thereto and a signal on conductor 47 representing the initiation of the starting of the motor actuates timer 46a. When a preset period of time passes the timer 46a provides a signal on conductor 48a. Reference was made to a duplicate signal on conductor 16a (FIG. 2) in connection with the description relating to FIG. 2. The signal on conductor 16a represents power and pulsates during starting at a frequency proportional to slip frequency. This signal is shown in FIG. 4 as applied to a block 39a which represents a detection means for determining when slip frequency has decreased to a predetermined frequency. The block 39a may represent circuitry similar to that indicated in FIG. 2 by bracket 39. The circuitry of block 39a provides an output signal on conductor 37a when the slip frequency has decreased to a predetermined level representing a predetermined rotor speed. A control means 45a, similar to field excitation control means indicated by bracket 45 in FIG. 2, receives the signal on conductor 37a, and energizes coil 42a in a manner similar to the energization of coil 42 in FIG. 2. When coil 42a is energized the normally closed switch 44b is operated to its open position. Conductor 48a is connected to one side of switch 44b and the other side is connected to conductor 50a which is connected to a tripping device.

In the apparatus of FIG. 4 a timer 46a thus receives an actuating signal on conductor 47 and provides an output on conductor 48a a predetermined period of time after it receives an actuating signal representing the initiation of starting. The detection means 39a and control means 45a operate to provide an energizing current to coil 42a when a predetermined slip frequency is reached representing a predetermined rotor speed. When coil 42a is energized, switch 44b is opened. If the rotor has not reached a speed which causes switch 44b to open, then the signal from timer 46a on conductor 48a will be passed to the tripping device (not shown) to disconnect the motor from the power source. If the rotor reaches its required speed before the timer 46a provides a signal, then switch 44b will be open and the signal will not be passed to the tripping device. The apparatus of FIG. 4, for example, may be used to disconnect the motor if the rotor has not reached say 25% of its synchronous speed within say four seconds of the initiation of starting.

It will, of course, be apparent that the apparatus of FIG. 3 and 4 could both be used in one starting apparatus according to the invention.

It will also be apparent that the apparatus of the invention could be used to apply field excitation in two stages if desired by using duplicate apparatus connected to conductor 16a (FIG. 2).

Because the power in a three phase system is a constant value, rather than pulsating, when the motor is synchronized, then it is relatively easy to use the apparatus according to the invention to detect when a synchronous motor falls out of step. The same apparatus is used and the level detector can be set to detect any pulsation and to cause the control means to provide a signal for warning or for tripping.

The invention may be used in other arrangements which involve the determination of speed of a salient pole synchronous motor. For example, in some instances it is desirable to have an autotransformer type starting arrangement which is known in the art. In this arrangement a starting circuit is provided which includes an autotransformer. The system of the prior art is arranged to provide from the autotransformer a reduced voltage to the motor. This is referred to as the reduced voltage mode. The motor begins to accelerate under this reduced voltage and after a predetermined time period the motor is switched to a reactor mode where full voltage is available but it is applied across a portion of the autotransformer winding in series with the motor. The motor continues to accelerate for a further time period and is then switched to the full voltage mode and field excitation is applied at the appropriate time.

In this autotransformer arrangement the switching from reduced voltage mode to the reactance mode is tuned. The switching from reactance mode to full voltage is tuned. The application of field excitation may be tuned or the speed measured by mechanical means as previously discussed. The use of tuning is inaccurate as acceleration varies with applied voltage. It is the speed of the motor that is significant in the switching and the timing may not result in the switching from one mode to another at the appropriate speed. However the present invention provides means for determining speed and can be used to determine when to switch and initiate switching from the reduced voltage mode to the reactor mode. It may also be used to determine when the desired speed is reached and initiate switching from the reactor mode to full voltage. The invention may also, as has already been described, initiate the application of field excitation. It will be seen that there are many ways in which the present invention may be used in the starting of salient pole synchronous motors.

What I claim as new and desire to secure by Letters Patent of the United States of America is:

1. Apparatus for use in the starting of a three phase salient pole synchronous motor, said motor having means to accelerate the rotor thereof towards synchronous speed and field excitation means to be energized to provide field excitation when the rotor reaches a predetermined speed, comprising power sensing means for deriving a first signal proportional to twice slip frequency, said power sensing means being connected only to the source of power supplying the motor, a capacitor, means connected to said capacitor for charging said capacitor at a predetermined rate, capacitor discharge control means responsive to said first signal proportional to twice slip frequency for discharging said capacitor at intervals related to said first signal, the charge on said capacitor being greater at said intervals become longer, lever detector means connected to said capacitor and responsive to the charge exceeding a predetermined level providing a second signal, and field excitation control means responsive to said second signal for energizing said field excitation means.

2. Apparatus as defined in claim 1 in which said predetermined rate for charging said capacitor is a constant rate.

3. Apparatus as defined in claim 1 in which said predetermined rate for charging said capacitor is adjustable to provide adjustment of the apparatus for the energization of said field excitation means at different frequencies of said first signal.

4. Apparatus as defined in claim 1 in which said means for connection to the source of power supplying the motor is a power sensor.

5. Apparatus for use in the starting of a three phase salient pole synchronous motor, said motor being connected to a three phase supply and having means to accelerate the rotor of said motor towards synchronous speed and having field excitation means to be energized to provide field excitation when said rotor reaches a predetermined speed, comprising power sensor means connected only to said three phase supply for obtaining a power determination which pulsates at a rate proportional to twice slip frequency and providing therefrom a first signal proportional to twice slip frequency, a capacitor, a constant current source connected to said capacitor for charging said capacitor at a predetermined rate, adjustment means on said constant current source to provide for adjustment of said predetermined rate, capacitor discharge control means responsive to said first signal for discharging said capacitor at intervals related to the frequency of said first signal, the charge on said capacitor being greater as said intervals become longer, level detector means connected to said capacitor and responsive to the charge thereon exceeding a predetermined level for providing a second signal, the time of occurrence of said second signal being adjustable by said adjustment means to correspond to a slip frequency which represents said predetermined speed, and field excitation control means responsive to said second signal for energizing said field excitation means.

6. Apparatus as defined in claim 5 and further comprising, a bandpass filter means connected between said power sensor means and said capacitor discharge control means for passing only frequencies in said first signal below the frequency of said supply.

7. Apparatus as defined in claim 6 in which the system frequency is 60 Hz and in which the bandpass filter passes frequencies in the range between about 1 Hz and 20 Hz.

8. Apparatus as defined in claim 5 and further comprising, wave shaping means connected between said power sensor means and said capacitor discharge control means for receiving said first signal and providing as an output a first signal having a rectangular waveform of the corresponding frequency.

9. Apparatus as defined in claim 5 and further comprising timing means having an input connected to said motor and actuated when said motor starting is initiated, said timing means providing a tripping signal a predetermined time period after actuation, a tripping device connected to said motor and having a tripped condition which disconnects said motor from the power source, switch means connected between said timing device and said tripping device and being responsive to the speed of said rotor being above a second predetermined speed to operate to its open condition and prevent said tripping signal from actuating said tripping device when said rotor exceeds said second predetermined speed within said time period.

10. Apparatus for use in the starting of a two, three, and six phase salient pole synchronous motor, said motor having means to accelerate the rotor thereof towards synchronous speed, and field excitation means to be energized to provide field excitation when the rotor reaches a predetermined speed, the apparatus comprising means for deriving a signal related to slip frequency, said means being arranged for connection only to the source of power supplying the motor, detection means for receiving said signal related to slip frequency and determining when said frequency decreases to a predetermined frequency valve representing said predetermined speed of said rotor and providing an output signal representing the determination, and field excitation control means for receiving said output signal and responsive thereto for energizing said field excitation means, said means for deriving a signal related to slip frequency comprising a plurality of power sensing means for sensing power in a sufficient number of phases to give a uniform total power indication at motor synchronous speed, said power sensing means providing signals representing sensed power in a respective phase of the supply, and means for receiving said signals and summing said signals to derive a signal representing supplied power, said signal representing supplied power fluctuating at a frequency related to slip frequency.

11. Apparatus as defined in claim 10 and further including filter means to filter from said output signal said line frequency.

* * * * *